(No Model.)

J. P. PFEIFFER & C. A. SPRY.
NUT LOCK.

No. 549,529.        Patented Nov. 12, 1895.

Witnesses.
Geo. E. Cumner
J. S. Goss

Inventors.
John P. Pfeiffer
Clarence A. Spry
By Thomas B. Siban
Their Attorney

ANDREW B.GRAHAM, PHOTO-LITHO, WASHINGTON, D.C.

UNITED STATES PATENT OFFICE.

JOHN P. PFEIFFER AND CLARANCE A. SPRY, OF WIOTA, IOWA.

NUT-LOCK.

SPECIFICATION forming part of Letters Patent No. 549,529, dated November 12, 1895.

Application filed June 15, 1895. Serial No. 552,895. (No model.)

*To all whom it may concern:*

Be it known that we, JOHN P. PFEIFFER and CLARANCE A. SPRY, citizens of the United States, residing at the town of Wiota, in the county of Cass and State of Iowa, have invented certain new and useful Improvements in Nut-Locks; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in nut-locks; and it consists in the peculiar construction and combination of the parts that will be more fully set forth hereinafter, and particularly pointed out in the claim.

The object of our invention is to provide a nut-lock of simple construction, by means of which a nut can be readily locked to the bolt to which it is fitted. We attain this object by the device illustrated in the accompanying drawings, in which—

Figure 2:
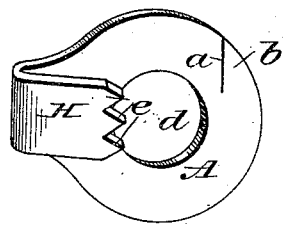
Figure 1:
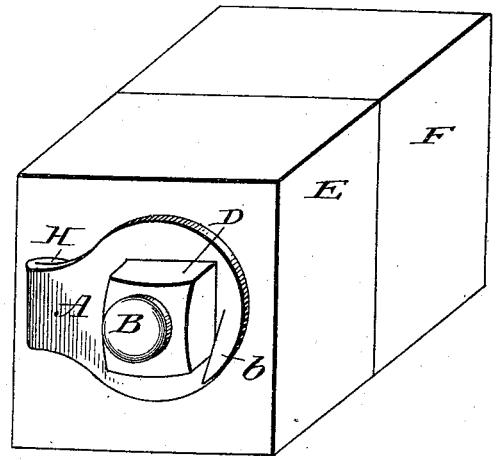
Figure 3:
Figure 4:
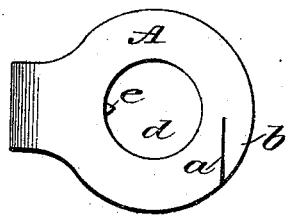

Figure 1 is a perspective view of our improved nut-lock, showing the nut of a bolt locked therewith. Fig. 2 is a perspective view of the nut-lock detached from the bolt; Fig. 3, a side view of the same, and Fig. 4 a top or plan view of same.

Similar letters refer to similar parts throughout the several views.

B is a bolt which is provided with the nut D. E and F are blocks through which the bolt B passes and which are secured together by the bolt and nut.

A is a washer-plate having the usual aperture *d* for the reception of the bolt. The washer-plate has cut therein the slit *a*, thereby forming thereon the locking-lip *b*. The washer-plate is provided with and has formed thereon and bent thereunder the arm H, having a series of teeth *e* on its inner end, and which arm extends from the edge of the washer-plate inward to the bolt, and which, before the nut is turned onto the bolt, declines outward from the washer, as shown in Fig. 3, but which is forced, by the turning on of the nut, against the under or inner side of the washer. We prefer to make the nut-lock of steel; but other metal can be employed.

The operation of our device is as follows: Place the washer on the bolt so that the arm H will bear against the thing to be bolted. Then turn the nut onto the bolt, which will force the arm H and washer toward each other, thereby forcing the teeth *e* into the bolt and locking the same to the washer. Then force the lip *b* outward from the washer and against the side of the nut, thereby locking the nut to the washer. It is evident that by the above-described operation the nut, washer, and bolt will be locked together.

Having described our invention, what we claim as new, and desire to secure by Letters Patent, is—

In a nut lock, a washer having formed upon and projecting from its periphery or outer edge an arm, which is bent under the washer and is adapted to be forced into engagement with the bolt which passes through the washer thereby locking the washer to the bolt, and having a lip formed from the body of the washer adapted to be bent into engagement with the sides of the nut, substantially as described.

In testimony whereof we affix our signatures in presence of two witnesses.

JOHN P. PFEIFFER.
CLARANCE A. SPRY.

Witnesses:
JOSHUA V. EMMERT,
JOSEPH S. GOSS.